(12) United States Patent
Bertsch et al.

(10) Patent No.: US 9,279,603 B2
(45) Date of Patent: Mar. 8, 2016

(54) FACADE ELEMENT

(75) Inventors: Stefan Bertsch, Sargans (CH); Daniel Oppliger, Sargans (CH); Tobias Menzi, Filzbach GL (CH)

(73) Assignee: GlassX AG, Zürich (CH)

( * ) Notice: Subject to any disclaimer, the term of this patent is extended or adjusted under 35 U.S.C. 154(b) by 0 days.

(21) Appl. No.: 13/995,674

(22) PCT Filed: Dec. 20, 2011

(86) PCT No.: PCT/CH2011/000304
§ 371 (c)(1),
(2), (4) Date: Jun. 19, 2013

(87) PCT Pub. No.: WO2012/083471
PCT Pub. Date: Jun. 28, 2012

(65) Prior Publication Data
US 2013/0263535 A1    Oct. 10, 2013

(30) Foreign Application Priority Data

Dec. 23, 2010  (CH) ........................................ 2163/10

(51) Int. Cl.
| F24J 2/04 | (2006.01) |
| F24J 2/24 | (2006.01) |
| F24J 2/26 | (2006.01) |

(Continued)

(52) U.S. Cl.
CPC ......... *F24J 2/42* (2013.01); *F24J 2/0444* (2013.01); *F24J 2/407* (2013.01); *F24J 2/465* (2013.01); *F24J 2/4649* (2013.01); *E06B 3/66304* (2013.01); *E06B 3/6722* (2013.01); *F24J 2/268* (2013.01); *F24J 2002/4603* (2013.01); *Y02B 10/20* (2013.01); *Y02E 10/44* (2013.01)

(58) Field of Classification Search
CPC ......... Y02E 10/44; Y02E 10/40; Y02E 10/47; F24J 2/20; F24J 2/202; F24J 2/42; F24J 2/465; F24J 2002/4603
USPC ........ 52/235, 234, 236.3, 173.3, 306, 506.01, 52/506.02, 506.03, 209, 302.1; 219/213; 165/80.1, 48.2, 49
See application file for complete search history.

(56) References Cited

U.S. PATENT DOCUMENTS

| 3,965,887 A * | 6/1976 | Gramer et al. ................ 126/666 |
| 4,050,443 A | 9/1977 | Peck et al. |

(Continued)

FOREIGN PATENT DOCUMENTS

| DE | 28 15 056 A1 | 10/1979 |
| DE | 20 2005 015 303 U1 | 9/2006 |

(Continued)

*Primary Examiner* — Joshua J Michener
*Assistant Examiner* — Kyle Walraed-Sullivan
(74) *Attorney, Agent, or Firm* — Sughrue Mion, PLLC

(57) ABSTRACT

A facade element for heat-insulation purposes has at least two parallel panels (101, 102), a cavity (103), which is formed between these two panels (101, 102) and has fluid flowing through it, and at least one inlet (13), for feeding a radiation-absorbing fluid, and at least one outlet (13'), for discharging the fluid. The inlet (13) is arranged on a first side of the panels (101, 102) and the outlet (13') is arranged on an opposite, second side of the panels (101, 102). The at least one inlet (13) and the cavity (103) have arranged between them a first flow distributor (14), which extends for distribution along the length of the first side. This facade element makes straightforward and cost-effective industrial production possible.

14 Claims, 7 Drawing Sheets

(51) Int. Cl.
    *F24J 2/42*     (2006.01)
    *F24J 2/40*     (2006.01)
    *F24J 2/46*     (2006.01)
    *E06B 3/663*     (2006.01)
    *E06B 3/67*     (2006.01)

(56) References Cited

U.S. PATENT DOCUMENTS

| | | | | |
|---|---|---|---|---|
| 4,056,090 A * | 11/1977 | Henriques et al. | | 126/667 |
| 4,103,675 A * | 8/1978 | Bar-On et al. | | 126/667 |
| 4,149,524 A * | 4/1979 | Severson | | 126/670 |
| 4,154,224 A * | 5/1979 | Ferriera | | 126/704 |
| 4,216,765 A | 8/1980 | Deminet | | |
| 4,243,020 A * | 1/1981 | Mier | | 126/670 |
| 4,252,103 A * | 2/1981 | Carter et al. | | 126/706 |
| 4,273,107 A * | 6/1981 | Methvin | | 126/600 |
| 4,282,856 A * | 8/1981 | Stehl et al. | | 126/706 |
| 4,292,956 A * | 10/1981 | Wasserman | | 126/651 |
| 4,515,150 A | 5/1985 | McGlew et al. | | |
| 4,515,151 A * | 5/1985 | Slemmons et al. | | 126/709 |
| 5,460,164 A * | 10/1995 | Rekstad et al. | | 126/714 |
| 5,477,848 A * | 12/1995 | Reed | | 126/659 |
| 5,645,045 A * | 7/1997 | Breslin | | 126/669 |
| 6,043,455 A * | 3/2000 | Kurita | | 219/213 |
| 6,201,313 B1 | 3/2001 | Nakamats | | |
| 7,367,164 B2 * | 5/2008 | Burton et al. | | 52/209 |
| 7,490,441 B2 * | 2/2009 | Burton et al. | | 52/209 |
| 2007/0084460 A1 * | 4/2007 | Beckman | | 126/625 |
| 2008/0083176 A1 * | 4/2008 | Barsun et al. | | 52/173.3 |
| 2008/0236572 A1 * | 10/2008 | Schaefer | | 126/657 |
| 2009/0044465 A1 | 2/2009 | Krecke et al. | | |
| 2009/0293862 A1 * | 12/2009 | Bailey | | 126/617 |
| 2010/0018521 A1 * | 1/2010 | Katsir et al. | | 126/704 |
| 2010/0044006 A1 | 2/2010 | Hernandez Ramos et al. | | |
| 2010/0147289 A1 * | 6/2010 | Kunczynski | | 126/634 |
| 2010/0180524 A1 * | 7/2010 | Jilken | | 52/173.3 |
| 2010/0198414 A1 * | 8/2010 | Kroll et al. | | 700/278 |
| 2010/0206300 A1 * | 8/2010 | Shabtay et al. | | 126/663 |
| 2011/0179726 A1 * | 7/2011 | Pao et al. | | 52/173.3 |
| 2011/0192393 A1 * | 8/2011 | Swift et al. | | 126/663 |
| 2011/0226233 A1 * | 9/2011 | Schwarz et al. | | 126/635 |
| 2011/0269087 A1 * | 11/2011 | DuChateau | | 432/29 |
| 2014/0305425 A1 * | 10/2014 | Prutsman et al. | | 126/635 |

FOREIGN PATENT DOCUMENTS

| | | |
|---|---|---|
| DE | 10 2004 059 897 A1 | 10/2006 |
| DE | 10 2008 064 010 A1 | 7/2010 |
| EP | 1 529 921 A2 | 5/2005 |
| EP | 2 123 856 A1 | 11/2009 |
| FR | 2 405 444 A1 | 5/1979 |
| WO | 98/51973 A1 | 11/1998 |
| WO | 03/040631 A1 | 5/2003 |
| WO | 2006/059071 A1 | 6/2006 |
| WO | 2007/009503 A1 | 1/2007 |
| WO | 2009/095031 A1 | 8/2009 |
| WO | 2010/083834 A2 | 7/2010 |

\* cited by examiner

FACADE ELEMENT

CROSS REFERENCE TO RELATED APPLICATIONS

This application is a National Stage of International Application No. PCT/CH2011/000304, filed on Dec. 20, 2011, claiming priority from Swiss Patent Application No. 2163/10, filed Dec. 23, 2010, the contents of all of which are incorporated herein by reference in their entirety.

TECHNICAL FIELD

The present invention relates to a facade element, and to a facade element system

PRIOR ART

It is known for transparent or translucent thermal insulation layers which are permeable to directed and diffuse solar radiation to be used in facade elements. Solar energy can thus be employed to heat buildings in a targeted manner. In addition or alternatively, the building interior can be protected from thermal radiation. These facade elements can, on the one hand, form parts of the wall and, on their rear side directed toward the building, adjoin a masonry structure or another type of building wall, or they can themselves form a building wall which is opaque with respect to the building interior. However, these facade elements can also be designed to be transparent and thus form a window of the building.

WO 98/51973 discloses a device for transparent thermal insulation on a building having three panes. The interspace facing the building interior is filled with a heat-insulating gas and the outer interspace is filled with a circulating liquid. This liquid, for example water, absorbs infrared light, but is designed to be transparent for visible light. Consequently, the building interior can be protected against heating from outside in summer. Furthermore, an expanded system is disclosed which comprises a fourth pane and a second cavity directed toward the building interior. Liquid heated by sunlight in the first cavity heats a heat accumulator. This releases heat, as required, to a second circuit to which the second cavity is connected. As a result, the building can be heated.

DE 10 2004 059 897 shows a window with a light flux control. A liquid circulates through a pipe system which is laid within the window. In order to darken the window, particles are present which are metered in a targeted manner to the liquid circulating through the window or removed therefrom. These substances can be pigments with magnetic and/or metallic and/or decorative properties.

U.S. Pat. No. 4,515,150 discloses a facade element having guide channels for the circulating liquid which are arranged between two panes. The liquid can contain metallic particles or a magnetic substance. It is proposed to mount magnetic coils on the sides of the facade element in order to influence the orientation of the particles and thus change the light transparency of the facade element.

EP 2 123 856 shows a facade element for active transparent thermal insulating comprising an additional water column in the window frame, which column is intended to reduce the pressure in the window.

These facade elements have the disadvantage that they are poorly suited to industrially efficient and cost-effective production.

SUMMARY OF THE INVENTION

It is therefore an object of the invention to provide a facade element for thermal insulation which overcomes this disadvantage.

The facade element is preferably designed as a window and thus permeable to visible light.

The facade element is preferably part of an active transparent or translucent thermal insulation unit in which a fluid is pumped in a closed circuit through at least one cavity of the facade element. This fluid preferably has the property that it absorbs at least infrared radiation and thus can release heat to a heat exchanger or heat accumulator. The fluid preferably consists of water or substantially of water with additives which are intended, for example, to prevent algae formation and the like and/or which are intended to avoid a freezing of the water. The panes are both preferably made of transparent glass.

At least three, four or five panes, in particular exactly four panes, are preferably present, wherein two cavities through which fluid flows are present which are formed by in each case two panes. As a result, heat which has been obtained from a first fluid by absorption of the solar radiation is released into a heat accumulator. This heat can be introduced in a targeted manner into the second cavity by means of a second fluid. The building can consequently be kept cool or heated in a targeted manner by means of a control circuit. The second fluid preferably keeps the surface, which projects into the building interior, of the innermost pane constant at a desired temperature which lies slightly below or above the room temperature depending on the cooling or heating function.

In a preferred embodiment, the facade element serves as a shading element, solar collector, heating element and cooling element in a.

It is additionally advantageous that the facade element can be designed to be relatively thin. Typical thicknesses for a 4-pane system are 4-7 cm.

A facade element according to the invention for thermal insulation comprises at least two panes arranged parallel to one another, a cavity which is formed between these two panes and has fluid flowing through it, and at least one inlet for feeding in a radiation-absorbing fluid and at least one outlet for discharging the fluid. The inlet is arranged on a first side of the panes and the outlet is arranged on an opposite, second side of the panes. According to the invention, a first flow distributor which extends in a distributed manner along the length of the first side is arranged between the at least one inlet and the cavity.

This flow distributor avoids or reduces an eddying of the inflowing liquid, with the result that the liquid flows uniformly through the cavity and is distributed in particular completely therein.

Thanks to the uniform distribution in the cavity, the absorption of the solar energy is optimized. Furthermore, it is possible with the use of darkening particles or pigments to achieve a uniform and complete darkening of the facade element.

This first flow distributor is preferably arranged only in an edge region of the panes. Preferably, the cavity is free from flow distributors except for its edge regions. The cavity preferably takes up an area which amounts to a substantial part of the panes, in particular 90-95% of a total pane area.

The first flow distributor preferably has nozzles through which the fluid is led into the cavity. These nozzles can be arranged in an edge region of the cavity.

In a preferred embodiment, the first flow distributor has, in the flow direction, a plurality of inlet openings with a first opening angle and an inlet path and a plurality of outlet openings with a second opening angle and an outlet path. The first opening angle is substantially greater than the second opening angle and the inlet path is substantially shorter than the outlet path. This shape forms a special type of nozzles which prevent an eddying of the fluid and at the same time keep the pressure loss of the fluid low. This results in a low pump power.

The first flow distributor is preferably a strip which has elevations and/or depressions which, for the fluid, form passages from the inlet to the cavity. These elevations and/or depressions preferably have a droplet-shaped design. The elevations and/or depressions can be arranged on a single side of the strip. However, they can also be arranged on both sides of the strip. The strip having elevations and/or depressions on one or two sides can be produced and mounted in the facade element in a simple and cost-effective manner.

This strip preferably sealingly closes the two panes between inlet and cavity except for the passages. As a result, further accesses of the fluid into the cavity which could in turn allow an eddying can be avoided.

The strip is preferably produced from plastic or a metal, in particular from aluminum.

In a preferred embodiment, the facade element has a plurality of inlets which are arranged in a distributed manner along the first side of the panes. Depending on the size of the facade element, more or fewer inlets can be present. This allows a targeted feeding of the fluid both in terms of flowrate and in terms of avoiding eddying.

In the vertical intended use position of the facade element, said first side which has the first flow distributor preferably forms the lowermost side of the facade element in its vertical use position. The fluid thus flows from bottom to top.

In a preferred embodiment, a second flow distributor is arranged between cavity and outlet. This avoids an eddying of the fluid as it exits from the cavity. This is advantageous in particular in the case of high facade elements.

The second flow distributor is preferably designed identically to the first flow distributor. However, it is preferably mirror-inverted as represented in the diagram or arranged in the same direction as the first flow distributor.

One or more outlets can be present. In the case of a plurality of outlets, these are advantageously arranged in a distributed manner over the second side.

In a further embodiment according to the invention, at least two panes arranged parallel to one another, a cavity which is formed between these two panes and has fluid flowing through it, and at least one inlet for feeding in a radiation-absorbing fluid and at least one outlet for discharging the fluid are present. The inlet is arranged on a first side of the panes and the outlet is arranged on an opposite, second side of the panes. According to the invention, a sealing ring is arranged between the two panes, which sealing ring delimits the cavity and seals it outwardly, wherein a spacing between the two panes which is closed with an adhesive is present between sealing ring and outer side. This sealing ring protects the adhesive from water, which means that conventional adhesives can be used.

This embodiment can be combined as desired with the aforementioned features of the other embodiments.

This embodiment has the advantage that the cavity is provided with a cost-effective and yet long-lasting seal, even if a liquid, in particular water, flows through the cavity. Since the fluid in the cavity makes contact only with the sealing ring, but not the adhesive, a cost-effective and standard commercial adhesive can be used, as is usually employed for adhesively bonding and sealing normal glass windows. In particular, silicone or a two-component adhesive can be used. The sealing ring is preferably made of rubber or neoprene. The sealing ring is preferably a cord, in particular a round cord, which is preferably designed to be overlapping or self-contained. A further variant is the direct spraying-on of the sealing cord by means of a robot. This allows a fully automatic application of the sealing ring by means of a robot and simplifies the production of the facade element.

The stability of the pane assembly and the sealing can be increased if spacers or spacer elements, which are arranged between sealing ring and adhesive and/or within the adhesive, are arranged in a distributed manner over the circumference of the two panes. These spacer elements prevent a movement of the two panes relative to one another and hence avoid stress on the adhesive. The spacer elements are preferably fixedly connected to at least one of the two pane surfaces, for example by adhesive bonding, soldering or welding. Examples of suitable spacer elements are cylindrical pins made of metal, plastic or glass.

A facade element system according to the invention has at least one facade element and a fluid circuit system for allowing at least one fluid to flow through the at least one facade element. Darkening particles can be admixed or are admixed with the fluid. According to the invention, the darkening particles are magnetic particles and/or photochromic particles and/or electrochromic particles.

By being distributed in the fluid, they allow an areal darkening which can be adjusted in terms of darkness. In a preferred embodiment, a darkening of 0% to 100% can be achieved by changing the particles from 0% by volume to 10% by volume.

Magnetic particles have the advantage that they can be admixed with the fluid or the liquid in the fluid circuit system during the operation and also removed from the fluid again. It is advantageous that these magnetic particles can be removed from the fluid again in a separator by means of a magnetic field in a simple manner. Here, they are ready for use again for the next use without further processing.

Instead of or in addition to the magnetic particles, photochromic and/or electrochromic particles can also be used to darken the facade element. These pigments are admixed with the fluid, remaining in the fluid and not being separated like the magnetic particles. Photochromic pigments can be activated by increasing the light irradiation. Electrochromic pigments can be controlled by electrical voltage.

Electrochromic and photochromic coatings of glasses are admittedly known. Since, however, such pigments are subjected to an ageing process by UV light, such glasses cannot be used for too long a period. Admixing the pigments into the liquid now has the advantage that they can be maintained and renewed together with the liquid. Suitable facade elements for this system are, in particular, but not exclusively, facade elements according to the aforementioned embodiments or combinations thereof.

The magnetic particles preferably have a size of 50 nm to 1000 nm. These are therefore nanoparticles. An advantage of particles of this order of magnitude is that on the one hand, they still behave magnetically and can be separated from the solution by means of a separating system. Moreover, they are small enough in order not to be individually perceived by the observer. The darkening is hence uniform. Finally, the bonds between the particles in this order of magnitude are small enough in order to be able to be split again. As a result, so-called clustering (clumping) in the pane can be controlled.

The magnetic particles are preferably black in order to produce a color-neutral darkening. However, they can have any desired color if the facade element is not to be darkened but is to assume a different color for visual design purposes. This can result, in particular on special occasions, in particular during the advent period, in visually attractive facade images. It can also be used for advertising purposes. For the purpose of sufficiently darkening the facade element, the magnetic particles are preferably present in a concentration of 0% by volume to 10% by volume in the fluid. To reduce the bonding between the magnetic particles, the fluid preferably has a pH value of 3 to 11.

The magnetic particles preferably have a surface which is untreated or covered with a thin plastic layer. This, too, reduces the bonding force between the magnetic particles.

In addition to the magnetic particles, additives (additions) are also preferably admixed with the fluid in order likewise to reduce the bonding between the magnetic particles.

A cluster formation can be avoided in that the residence time in the window is controlled and an atomization of the concatenated particles takes place in the fluid circuit, preferably during entry into the cavity between the panes. This atomization can be achieved by high shearing forces in static mixers, nozzles or pumps.

Further embodiments are indicated in the dependent claims.

BRIEF DESCRIPTION OF THE DRAWINGS

Preferred embodiments of the invention are described below with reference to the drawings which serve merely for illustration and are not to be interpreted as limiting. In the drawings.

DESCRIPTION OF PREFERRED EMBODIMENTS

Figure 1:
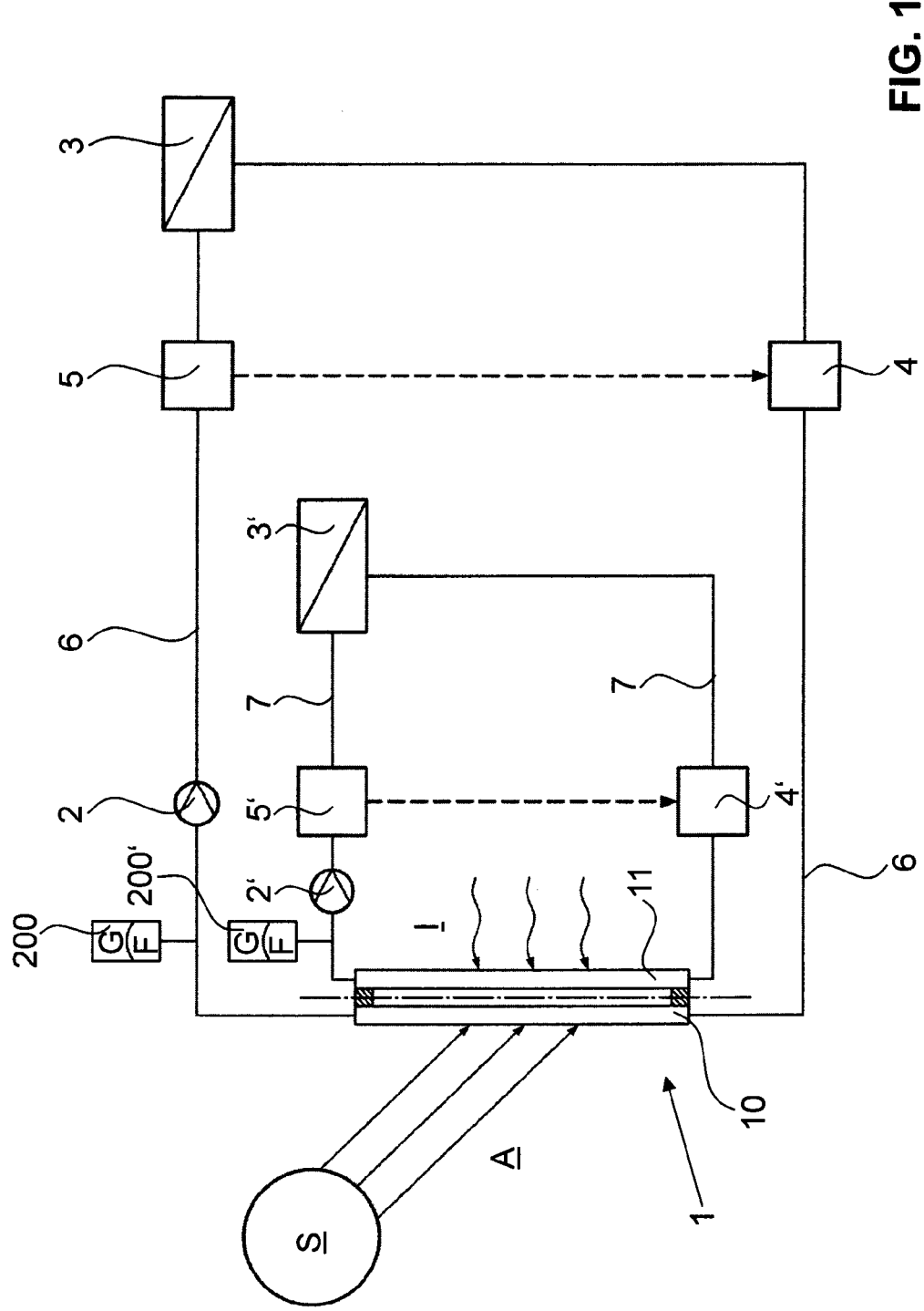
FIG. 1 shows a schematic representation of a facade element system according to the invention in summer.
Figure 2:
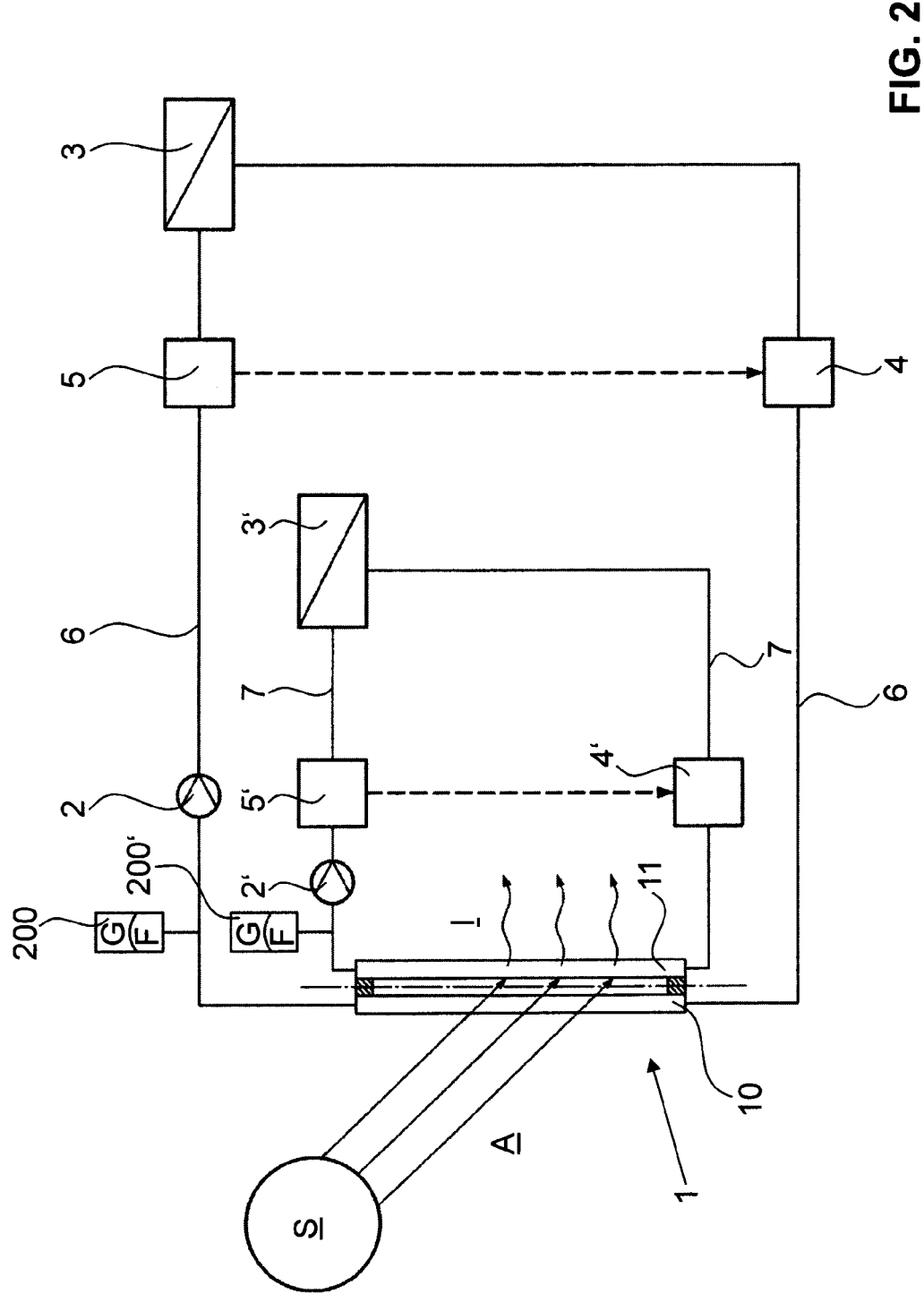
FIG. 2 shows the facade element system according to FIG. 1 in winter.

The facade element system according to the invention uses the findings described in WO 98/51973. FIGS. 1 and 2 illustrate the basic principle.

Two pane pairs 10, 11 are arranged parallel to and at a distance from one another. The panes preferably all consist of transparent glass, such that the facade element can be a window of a building.

Each pane pair 10, 11 consists of two panes which are arranged at a distance from one another and form between them a first and second cavity, respectively. The pane pair having the reference sign 10 is directed toward the outside A with respect to the building and encloses the outer cavity, and the other pane pair having the reference sign 11 is directed toward the building interior I and encloses the inner cavity.

Between the two pane pairs 10, 11 there is a third cavity 12 which serves for thermal separation. For this purpose, it is preferably filled with a thermally insulating gas, for example with krypton or xenon. It can also be evacuated. Alternatively or in addition, a further pane can be present in this third cavity in order to improve the insulation.

There are preferably two circuits 6, 7 which can be controlled separately from one another and which allow a fluid to flow through a respective cavity of the pane pairs 10, 11. With vertically oriented facade elements, the fluid here preferably flows vertically upward from the underside of the facade element. If the two circuits are controlled separately from one another, the apparatus is also preferably designed to be doubled. That means to say that, as shown in the figures, each circuit is preferably provided with a separate pump, a separate separator, a separate metering device and a separate heat exchanger. However, it is also possible that the two circuits share some or all of these elements with one another.

The fluid is preferably water. It can be provided with additives which prevent unwanted deposits being formed, such as, for example, algae formation and/or precipitation of substances. In addition or alternatively, it is prevented that the water freezes. Infrared is absorbed and converted into heat, and visible light can pass preferably unimpeded through the fluid. The fluid can also be, in particular, a liquid mixture based on water or another liquid. As will be described further below, it can be provided with further additives and particles.

In the example illustrated, there is arranged in the two circuits 6, 7 at least one respective heat exchanger 3, 3'. Both circuits 6, 7 are preferably connected to separate heat exchangers 3, 3', but they can also be connected to a common heat exchanger. Furthermore, a heat accumulator can be present.

In the circuits 6, 7 there is here in each case a pump 2, 2' in order to pump the fluid through the respective cavity. Here, too, two separate pumps 2, 2' are preferably used. However, a common pump can also be employed. The pumps 2, 2' are preferably suction pumps which suck the fluid from the cavity and thus reduce the pressure in the respective cavity. Valves (not shown) control the flow through the outer and inner cavity. An electronic control unit (not shown) and temperature and flow sensors (not shown) control the underheating or overheating of the fluid with respect to the temperature in the building interior depending on whether cooling or heating is to be performed by controlling the flow in the two cavities. The degree of absorption can be controlled, for example, via the particle concentration. The higher the particle concentration, the higher the absorption capacity of the fluid.

The pumps 2, 2' can be used not only for transporting the fluid, but also to produce an underpressure in the cavities 103 in this case. To produce it, alternatively or in addition, expansion vessels 200, 200' can also be used. These have a gas side G and a fluid side F which are separated from one another via a membrane. The membrane is represented in the figure with a curved line in the vessel 200, 200'. On the gas side G there prevails an underpressure which is transmitted via the membrane to the fluid side F and thus into the circuits 6, 7 and the cavities 103.

At least in the outer circuit 6 which serves the outer cavity, there is a first metering device 4 and a first particle separator 5. Particles for darkening the outer cavity can be introduced into the fluid in the first metering device 4. They are removed again from the circuit in the first separator 5.

Particles for darkening or for changing the color of the inner cavity can also be introduced into the second inner circuit 7. However, it is also possible that during operation no change of the fluid composition is carried out. In the example illustrated, a corresponding second metering device 4' and second separator 5' are present in the inner circuit 7.

The arrangement of metering device 4, 4' and separator 5, 5' in FIGS. 1 and 2 is purely schematic. Metering device 4, 4' and separator 5, 5' can be arranged at a single point in the two circuits 6, 7. The dashed arrows in the figures between metering device 4, 4' and separator 5, 5' schematically show the path of the metal particles separated from the fluid for reuse in the metering device 4, 4'.

The inner and the outer circuit 6 and 7 extend separately from one another. In a simple embodiment, they can be connected to one another via a common heat exchanger and/or the heat accumulator. However, they preferably extend completely separately from one another and each has a separate heat exchanger 3, 3'.

In summer, for example, the outer circuit, which is very warm, can be used as a preheater for thermally operated refrigeration machines. The inner circuit can, in summer, be cool at the same time for cooling purposes. In winter, the arrangement is reversed. The outer liquid layer can be very cold, while the inner layer is warm for heating.

FIG. 1 depicts the situation in summer. In the outer circuit 6, particles circulate and darken the outer pane pair 10. Infrared radiation from the sun S is absorbed by the fluid in the outer pane pair 10 and released to the heat accumulator as heat. Moreover, the pane pair 10 is preferably darkened by admixing darkening particles in the fluid, such that visible light is also absorbed or reflected and can pass only to a reduced degree, if at all, into the building interior I. In the inner circuit 7, cooled fluid can additionally flow through the inner pane pair 11 and thus cool the building interior.

In winter, by contrast, no darkening of the outer pane pair 10 takes place. In other words, the darkening particles are removed from the outer fluid. However, infrared radiation from the sun S is still absorbed by the outer fluid and released to the inner circuit via the heat exchanger. This heat is used to heat the inner pane pair 11 and thus release the heat to the building interior I. Moreover, the outer pane interspace can also be evacuated in order to guide the solar radiation directly to the inner pane pair 11. As a result, the heat is transferred directly inside the building. Furthermore, it is possible in the case of insufficient radiation incidence to use the cavity of the inner pane pair 11 to release heat from an accumulator or another heat source to the building interior.

Figure 3:
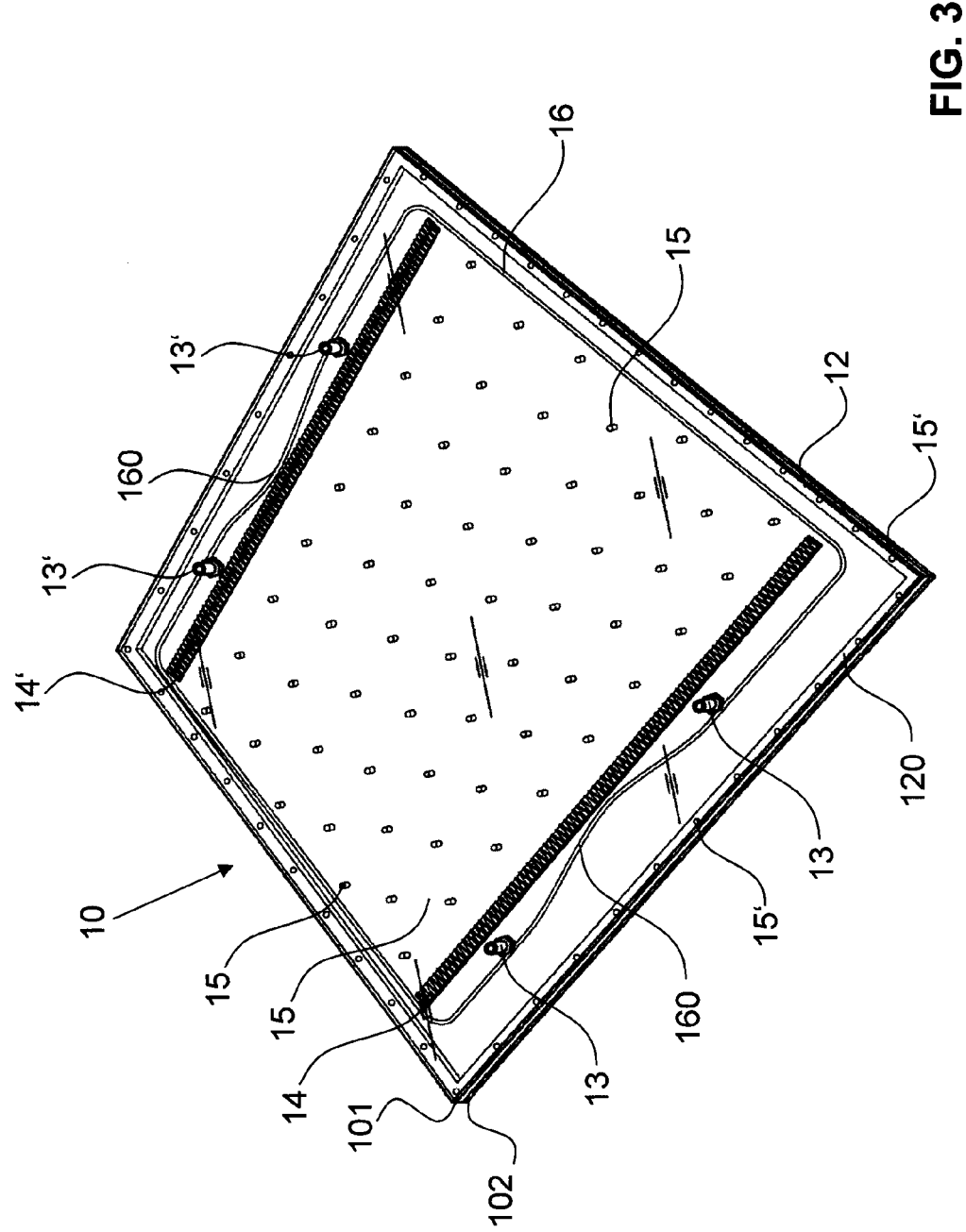
FIG. 3 shows a schematic representation of a pane pair according to the invention of a facade element in a perspective representation.

FIG. 3 schematically illustrates a pane pair according to the invention, as is used in the above-described system. This can be the first or second pane pair 10, 11. Both are preferably of identical design. A first pane 101 extends in a plane-parallel manner but at a distance from a second pane 102. Both panes are made of glass and are preferably designed to be transparent. They can have, toward the cavity, one or two layers which reflect infrared radiation in order to better insulate the cavity.

Between the two panes 101, 102 is formed a cavity 103 which is delimited by a peripheral, self-contained sealing ring 16. The sealing ring 16 is preferably a round cord, in particular made of rubber or neoprene. The sealing ring 16 is dimensioned with such a thickness that it fills the spacing between the two panes 101, 102 and thus outwardly seals the cavity 103.

An adhesive 120 is present between sealing ring 16 and outer side of the pane pair 10. This adhesive extends around the entire circumference of the pane pair 10. It preferably extends in the outermost edge region of the panes 101, 102. Thanks to the sealing ring 16, known adhesives for normal windows, in particular silicone, can be used as adhesive 120.

The spacing between adhesive 120 and sealing ring 16 is depicted to be relatively large in FIG. 3. This serves only for better understanding. The adhesive 120 can adjoin the sealing ring 16 directly or at a small distance such that the edge region, consisting of sealing ring 16 and adhesive 120, can be designed to be relatively narrow. It can be, in particular, 10 to 30 mm.

Spacer elements 15 are arranged in the cavity 103 and keep the two panes 101, 102 at a constant distance from one another. Examples of suitable spacer elements are cylindrical pins made of metal, glass, ceramic or plastic. They are preferably fixedly connected to one of the two panes 101, 102, in particular by adhesive bonding or welding. The spacer elements are dimensioned to be small enough that they can barely be perceived when viewing the window. They preferably have a diameter of 1 to 3 mm, preferably approximately 1 mm.

Figure 5:
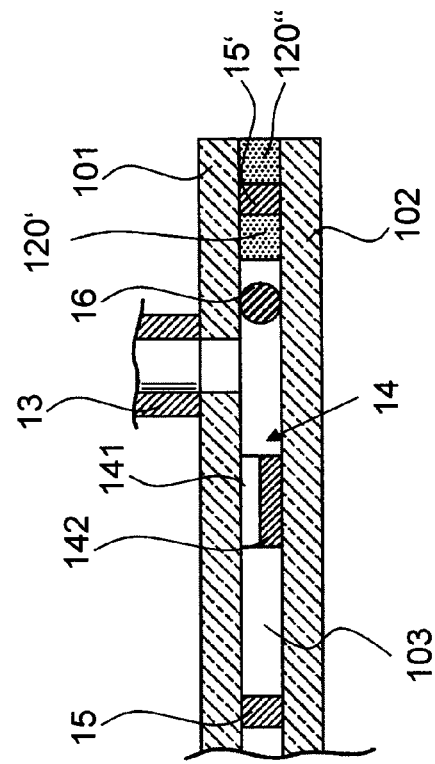
FIG. 5 shows a cross section through an edge region of the pane pair according to FIG. 3 in an enlarged representation.

Marginal spacer elements 15' are also preferably present in the edge region. These can have an identical design to the spacer elements 15 in the cavity 103. FIG. 5 illustrates a preferred arrangement. The adhesive 120 is subdivided into an inner adhesive region 120' and an outer adhesive region 120". The marginal spacer elements 15' are arranged between these two peripheral adhesive regions 120', 120".

As can be seen clearly in FIG. 3, the pane pair 10 is provided with at least one inlet 13 and at least one outlet 13'. For this purpose, corresponding connection elements 13, 13' are let into the first pane 101 in the region of the cavity 103, i.e. within the area enclosed by the sealing ring, and thus provide a connection from outside to the cavity 103, as can be seen clearly in FIG. 5. These inlets 13 and outlets 13' are connected to the circuit 6, 7 and thus allow the fluid to flow into the cavity 103 and out again.

Figure 10:
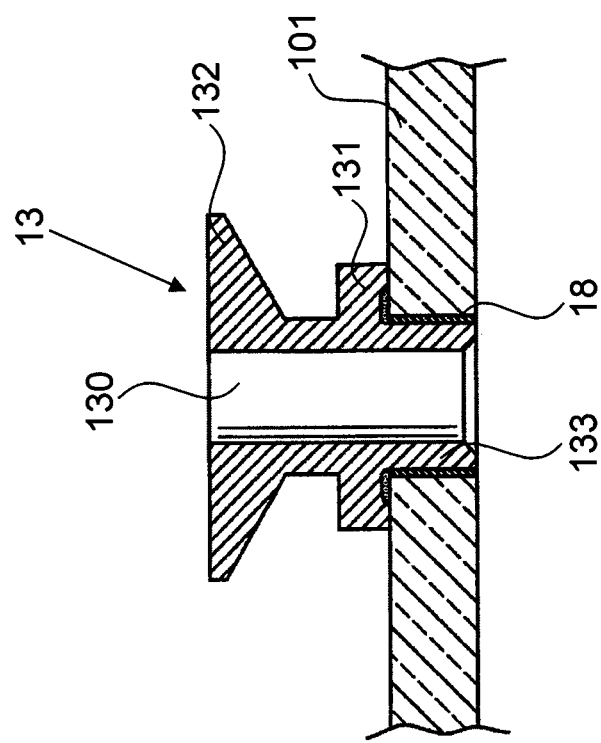
FIG. 10 shows a cross section through a pane of the facade element according to FIG. 3 in the region of an inlet.

A preferred embodiment of such an inlet 13 is illustrated in FIG. 10. The outlet 13' can have an identical design. The inlet 13 and the outlet 13' must be sealingly connected to the glass of the pane 101. In this case, the illustrated form has proved to be preferred. The inlet 13 has a stub 133 which is inserted into an opening of the pane 101. The stub 133 is followed by a stop 131 in the form of a peripheral flange which bears on the outer side of the pane 101. Both this bearing surface and the contact area of the lateral surface of the stub 133 with the glass pane 101 is sealed. The corresponding means for producing the sealings are provided with the reference signs 18, 18' in FIG. 10. 18 designates a sealing joint, in particular for a sealing with silicone. 18' designates, for example, an adhesive joint for adhesive bonding. Direct contact between adhesive and fluid is therefore avoided. Alternatively, ultrasonic welding can also be used. The connection sleeve 132 can have any desired shape and must only be suitable for simple connection to the coupling part of the line.

Figure 4:
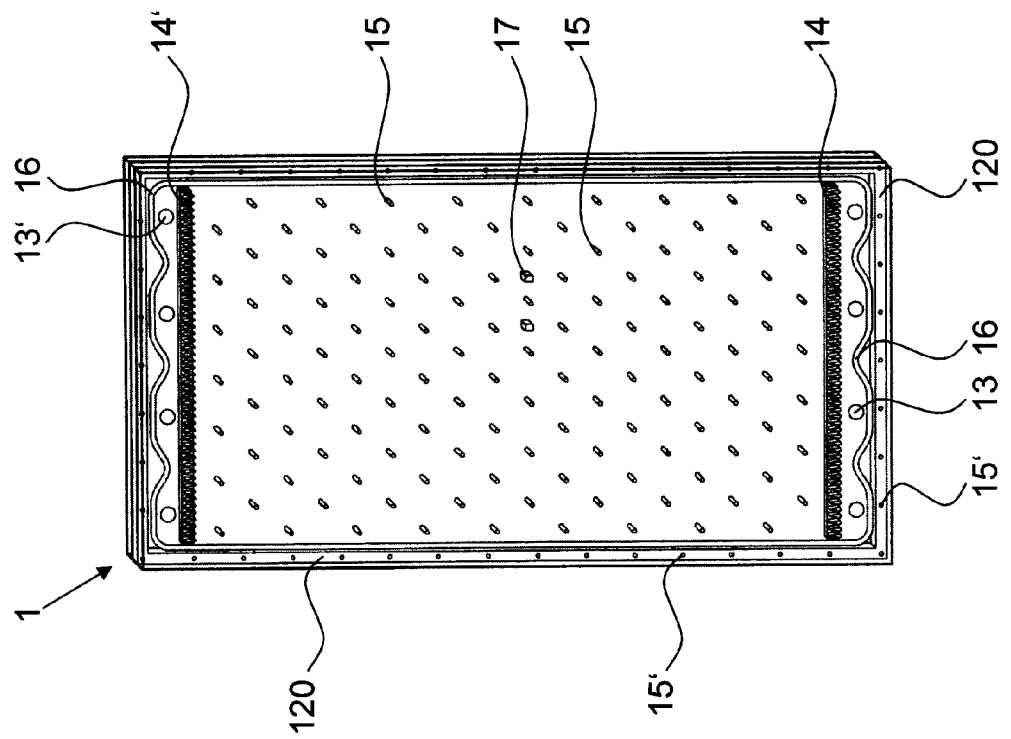
FIG. 4 shows a schematic representation of a facade element according to the invention in a perspective representation.

As can be seen in FIGS. 3 and 4, the sealing ring 16 extends in a bow 160 in the region between two inlets 13 or two outlets 13'. Here, the bow is directed toward the cavity 103. Corresponding bows 160 can also be present between the inlets/outlets 13, 13' and the edge of the pane pair. In conjunction with a flow distributor 14 according to the invention which will be described below, the bows 160 have proved to be advantageous for avoiding turbulence in the fluid.

The inlet-side flow distributor 14 has a strip-shaped design and preferably extends over the entire width of the cavity 103, at least approximately. In this exemplary embodiment, it is produced from a metal, preferably from aluminum. It is situated between inlet 13 and remaining cavity 103. The sealing ring 16 approximately makes contact by way of its bows 160 with the flow distributor 14.

FIGS. 5, 6, 8 and 9 show details of the flow distributor 14 in an enlarged representation. It fills the spacing between the two panes 101, 102 such that it contacts both panes 101, 102, as can be seen in FIG. 5. Here, however, it leaves passages 141 free between the inlet 13 and the cavity 103. These passages 141 are designed as nozzles. For this purpose, the flow distributor 14 has elevations 140 which are arranged at a distance from one another along the strip, and their spacings thus form the passages or through-openings 141. The lower region 142, which is directed toward the second pane 102, is in this case designed to be completely closed.

Figure 7:
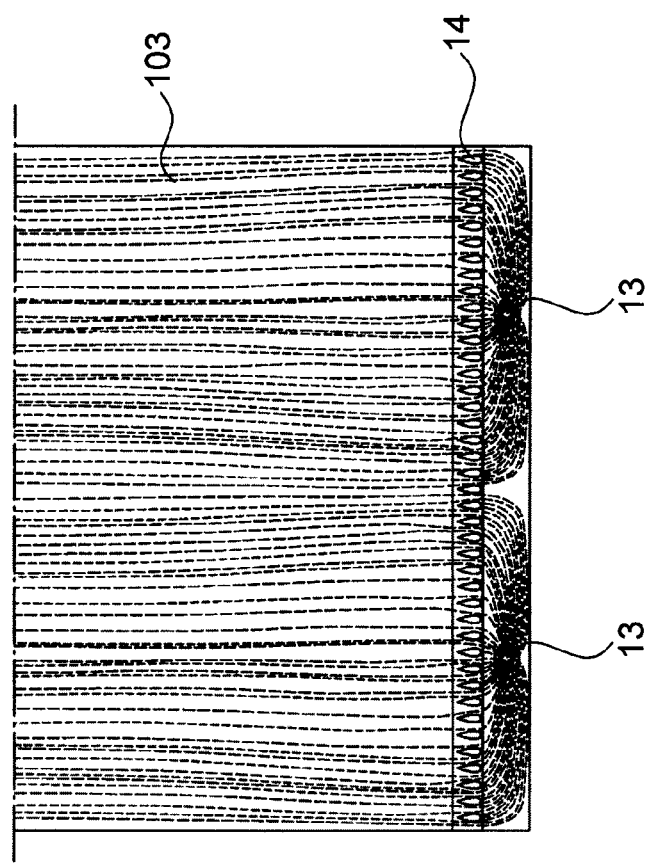
FIG. 7 shows a schematic representation of the mode of operation of a flow distributor according to the invention.
Figure 6:
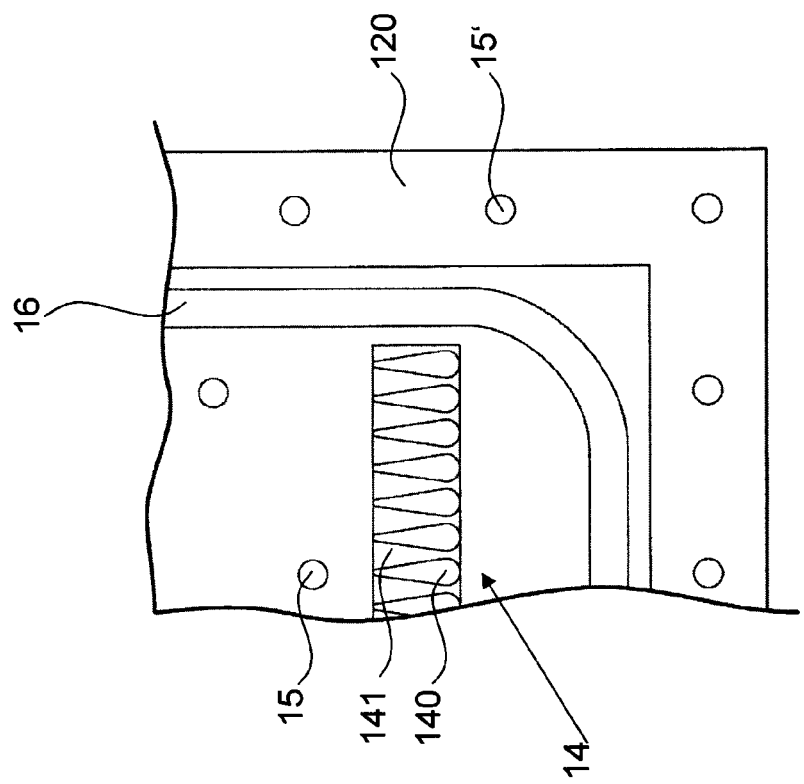
FIG. 6 shows an enlarged representation of a corner region of the pane pair according to FIG. 3.
Figure 9:
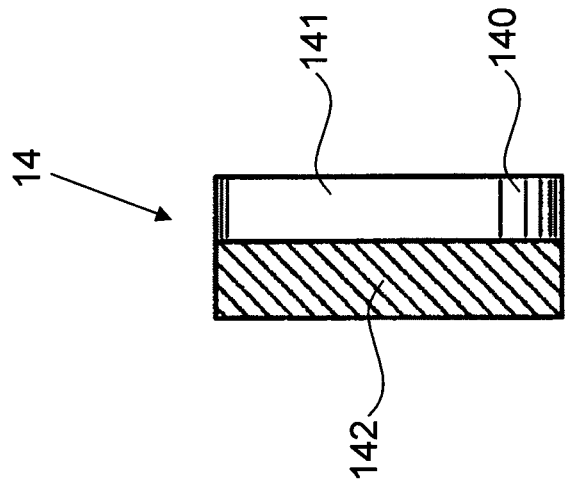
FIG. 9 shows a cross section through a part of the flow distributor according to FIG. 8 along A-A.
Figure 8:
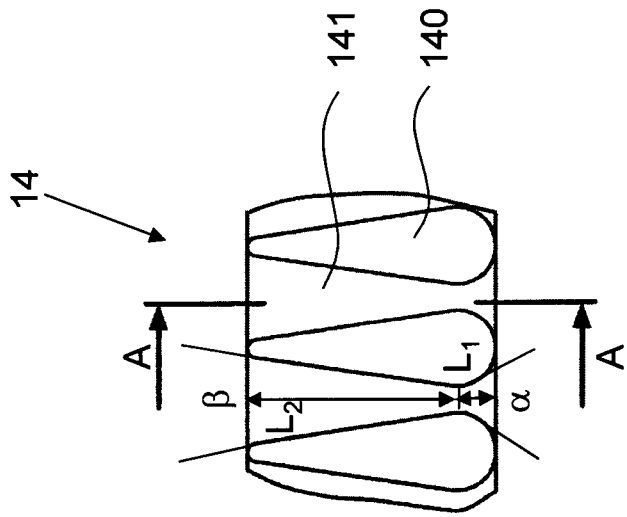
FIG. 8 shows an enlarged representation of a part of the flow distributor according to FIG. 7 from above.

The elevations 140 have a droplet-shape design. They form a short inlet region $L_1$ with an inlet angle $\alpha$ and a long outlet region $L_2$ with an outlet angle $\beta$. The inlet angle $\alpha$ here is substantially greater than the outlet angle $\beta$. This shape leads to a calming of the flow and thus prevents eddying of the fluid as it enters the cavity 103. At the same time, this flow distributor 14 allows the uniform distribution of the fluid, in particular the aqueous liquid, in the cavity 103. The flow behavior is schematically illustrated in FIG. 7. It can be seen here how the bows 160 of the sealing ring 16, which is not illustrated here, guide the fluid as it flows out of the inlet 13 in the direction of the flow distributor 14 and thus in the direction of the cavity 103.

A flow distributor 14' is preferably also arranged in the region of the outlets 13'. This flow distributor 14' on the outlet side is preferably designed identically to the flow distributor 14 on the inlet side. However, in this example, it is arranged with mirror symmetry, i.e. the large angle region $\alpha$ with the short path $L_1$ is directed toward the cavity, while the small angle region $\beta$ with the long path $L_2$ is directed toward the outlets 13'. However, the arrangement can also be symmetrical such that the flow distributor 14' on the outlet side is identically oriented to the flow distributor 14 on the inlet side. This symmetrical arrangement reduces the pressure loss and thus the pump output.

The second pane pair 11 is preferably of identical design.

These above-described pane pairs 10, 11 can preferably be darkened, for which purpose particles of known type can be used. However, magnetic particles are preferably used for this purpose. In FIG. 4, two such particles are symbolically represented in greatly enlarged form and provided with the reference number 17. The magnets are preferably used in the form of nanoparticles which can be admixed with the fluid in order to darken the panes. Depending on the admixing degree, a lesser or greater darkening occurs.

The facade element according to the invention and the facade element system according to the invention allow simple and cost-effective industrial production.

LIST OF REFERENCE SIGNS

1 Facade element
10 Outer pane pair
11 Inner pane pair
12 Third cavity
101 First pane
102 Second pane
103 Cavity
120 Adhesive
120' Inner adhesive region
120" Outer adhesive region
13 Inlet
13' Outlet
130 Inlet opening
131 Stop
132 Connection sleeve
133 Stub
14 First flow distributor
14' Second flow distributor
140 Elevation
141 Through-opening
142 Lower region
15 Spacer element
15' Marginal spacer element
16 Sealing ring
160 Bow
17 Magnetic particles
18 Seal
18' Adhesive bonding/welding
2 First pump
2' Second pump
200 First expansion vessel
200' Second expansion vessel
3 First heat exchanger
3' Second heat exchanger
4 First metering device
4' Second metering device
5 First particle separator
5' Second particle separator
6 Outer circuit
7 Inner circuit
$\alpha$ First inlet angle
$\beta$ Second inlet angle
$L_1$ Inlet path
$L_2$ Outlet path
A Outer side of the building
I Inner side of the building
S Sun
G Gas side of the expansion vessel
F Fluid side of the expansion vessel

The invention claimed is:

1. A facade element for thermal insulation comprising:
at least two panes arranged parallel to and at a distance from one another,
a cavity which is formed between said at least two panes,
at least one inlet for feeding a radiation-absorbing fluid into the cavity,
at least one outlet for discharging the fluid from the cavity, and
a first flow distributor arranged within the cavity,
wherein the at least one inlet is arranged on a first side of the at least two panes and the at least one outlet is arranged on an opposite, second side of the at least two panes,
wherein the first flow distributor is a strip that extends along the first side in an edge region of the at least two panes, between an inlet portion of the cavity and a remaining portion of the cavity, the strip filling the distance between the at least two panes such that the strip contacts the at least two panes, the strip having a longitudinal direction and the strip defining a plurality of passages, each passage connecting the inlet portion and the remaining portion of the cavity, the strip thereby sealingly separating the inlet portion from the remaining portion except for the passages,
the strip having elevations, which are arranged at a distance from one another along the strip to form spacings between the elevations, the passages being formed by said spacings, the passages thereby extending in a direction perpendicular to the longitudinal direction of the strip.

2. The facade element as claimed in claim 1, wherein the passages form nozzles.

3. The facade element as claimed in claim 2, wherein each nozzle has, in a flow direction, an inlet opening, the inlet opening narrowing along the flow direction and having a first opening angle in a plane defined by said at least two panes, the inlet opening defining an inlet path, and wherein each nozzle has, downstream from said inlet opening, an outlet opening, the outlet opening widening along the flow direction and having a second opening angle in said plane, the outlet opening defining an outlet path, wherein the first opening angle is greater than the second opening angle and the inlet path is shorter than the outlet path.

4. The facade element as claimed in claim 1, wherein the elevations have a droplet shape when viewed in a plane defined by the at least two panes.

5. The facade element as claimed in claim 1, wherein the strip is produced from plastic or from a metal.

6. The facade element as claimed in claim 1, wherein a plurality of inlets are present which are arranged in a distributed manner along the first side of the at least two panes.

7. The facade element as claimed in claim 1, wherein the first side is the lowermost side of the facade element in its vertical use position.

8. The facade element as claimed in claim 1, wherein a second flow distributor is arranged in the cavity upstream of the at least one outlet.

9. The facade element as claimed in claim 8, wherein the second flow distributor is designed identically to the first flow distributor and is oriented identically or in a mirror-inverted manner.

10. The facade element as claimed in claim 1, wherein a plurality of outlets are provided which are arranged in a distributed manner over the second side.

11. A facade element for thermal insulation comprising:
at least two panes arranged parallel to and at a distance from one another,
a cavity which is formed between said at least two panes,
at least one inlet for feeding a radiation-absorbing fluid into the cavity,
at least one outlet for discharging the fluid from the cavity, and
a first flow distributor arranged within the cavity,
wherein the at least one inlet is arranged on a first side of the at least two panes and the at least one outlet is arranged on an opposite, second side of the at least two panes,
wherein the first flow distributor extends along the first side in an edge region of the at least two panes, between an inlet portion of the cavity and a remaining portion of the cavity, the first flow distributor filling the distance between the at least two panes such that the first flow distributor contacts the at least two panes, the first flow distributor defining a plurality of passages, each passage connecting the inlet portion and the remaining portion of the cavity, the first flow distributor thereby sealingly separating the inlet portion from the remaining portion except for the passages,
the passages forming nozzles, each nozzle having, in a flow direction, an inlet opening, the inlet opening narrowing along the flow direction and having a first opening angle in a plane defined by said at least two panes, the inlet opening defining an inlet path, and each nozzle having, downstream from said inlet opening, an outlet opening, the outlet opening widening along the flow direction and having a second opening angle in said plane, the outlet opening defining an outlet path, and
wherein the first opening angle is greater than the second opening angle and the inlet path is shorter than the outlet path.

12. The façade element according to claim 1 wherein the at least two panes are transparent.

13. The façade element according to claim 1 wherein the façade element is permeable to visible light.

14. The façade element according to claim 1 wherein the façade element is a window.

* * * * *